United States Patent [19]

Grish et al.

[11] 4,368,028

[45] Jan. 11, 1983

[54] ANNULAR FLOW PLASTIC EXTRUSION NOZZLE OR GATE

[76] Inventors: Anthony J. Grish; Thomas A. Grish, both of P.O. Box 248, St. John, Ind. 46373

[21] Appl. No.: 239,519

[22] Filed: Feb. 2, 1981

[51] Int. Cl.³ .............................................. B29F 1/03
[52] U.S. Cl. .................................... 425/569; 425/568
[58] Field of Search ............................. 425/568–569, 425/571

[56] References Cited

U.S. PATENT DOCUMENTS 2,817,115 12/1957 Freifeld ........................... 425/568 X Primary Examiner—Thomas P. Pavelko
Attorney, Agent, or Firm—Kerkam, Stowell, Kondracki & Clarke

[57] ABSTRACT

An annular flow plastic extrusion nozzle or gate is provided with a torpedo to heat the plastic to be extruded through the gate. A passage is provided around the torpedo and the torpedo has a flattened end in the parting line of the mold. An annular opening is provided around the base of the torpedo in the nozzle or gate housing. A conical recess is provided in the flat end of the torpedo to receive a correspondingly shaped male extension of a shaft or core pin removably mounted in a portion of the mold. A hub cavity in that portion of the mold may be provided around the end of the pin and mold cavities extend therefrom as desired to form propellers or impellers or rotors of the desired configuration. Discharge of the flowable plastic through the 360° annular nozzle or gate into the mold cavities prevents any compacting of the plastic and provides an even distribution and flow thereof whereby the resulting propeller, impeller or rotor has no heavy spots affecting even and uniform rotation about the precisely centered core pin or shaft.

2 Claims, 3 Drawing Figures

ANNULAR FLOW PLASTIC EXTRUSION NOZZLE OR GATE

DESCRIPTION

Background of Prior Art

Hot Tip Bushing Systems for plastic molding are well known and such systems are commercialized by Inco Corporation. For example, Inco Corporation owns U.S. Pat. No. 3,707,265 which discloses and claims a nozzle for a plastic injection molding machine utilizing a torpedo to maintain the plastic fluid while the plastic is forced around the torpedo and through an opening into a mold section of predetermined configuration to cast a desired shape in cooperation with a second mold portion. In this patent the flow passage around the torpedo has an annular shape but the nozzle is not annular since the torpedo terminates away from the nozzle or gate and not in the parting line of the mold sections.

U.S. Pat. No. 3,204,293 discloses another type of apparatus for molding hollow tubular articles in which the gate is formed of a plurality of circumferentially spaced passages closely spaced in an annular pattern to open directly over the annular mold space. In this apparatus core pin 20 is spaced from the lower surface of the gate and the gate may have a secondary passage 39 to facilitate filling of the end space between the gate and the end of the core pin.

U.S. Pat. No. 3,010,155 is of interest in showing the general construction of a heated torpedo used with an extrusion nozzle for plastic in which the torpedo terminates short of the circular orifice of the nozzle through which the heated plastic is extruded.

This prior art, which is the best prior art known to applicants, does not meet the requirements for even distribution of weight of plastic in the formation of propellers, impellers or rotors for uniform and even rotation about a hub or shaft or shaft pin since it is possible in all of these known constructions for the plastic to become more dense randomly in portions of the mold thus destroying the rotational balance of the end product.

In the extrusion molding of rotary elements, it is essential that the core pin or axle be exactly centered with respect to the hub and to the vanes of the device to prevent rotational imbalance. No prior art known to applicants provides for this exact centering of the core pin or axle by mating the same with the lower end of the torpedo in the parting line of the mold elements and centering on an annular flow passage for the plastic from the torpedo into the mold elements. Applicants have found that, by so centering the core pin or axle and discharging the plastic mold into the mold around the core pin or axle through an annular orifice in the parting line of the mold elements, the resulting rotary plastic structures are of uniform density and exhibit uniform rotational balance in subsequent use.

Brief Description of the Invention

An annular plastic extrusion nozzle or gate has a base mounted in a mold element with the base having a bore tapered at one end thereof toward the parting line of the mold with a torpedo disposed in the bore and internally spaced therefrom for an annular flow of the plastic around the torpedo in the bore. The torpedo is provided with a flat end surface in the parting line of the mold elements and that end portion of the torpedo is correspondingly tapered to the tapered end of the bore so that the fluid plastic is extruded from the bore around the tapered end of the torpedo through a 360° annular opening. A second mold element cooperating with the first mold element and joining the same along the parting line has formed therein the cavities suitable for the extrusion molding of a propeller, impeller or rotor including a centrally disposed bore for receiving a core pin or shaft opening into a portion of the mold to form the hub whereby the shaft or core pin extends therethrough and into engagement with the flattened end of the torpedo when the mold elements are assembled. The core pin or shaft is centered with respect to the mold cavities and the hub cavity by a male element formed on an end thereof which engages in a female recess in the flat end of the torpedo. The torpedo maintains the plastic fluid while it is being forced around the torpedo and out through the annular orifice into the mold cavities and around the core pin or axle in the hub cavity of the mold cavities without distortion of the position of the core pin or axle with resulting rotational balance of the finished product.

Brief Description of the Drawings

In the accompanying drawings, in which like reference characters indicate like parts.

DESCRIPTION OF THE PREFERRED EMBODIMENT

Figure 1:
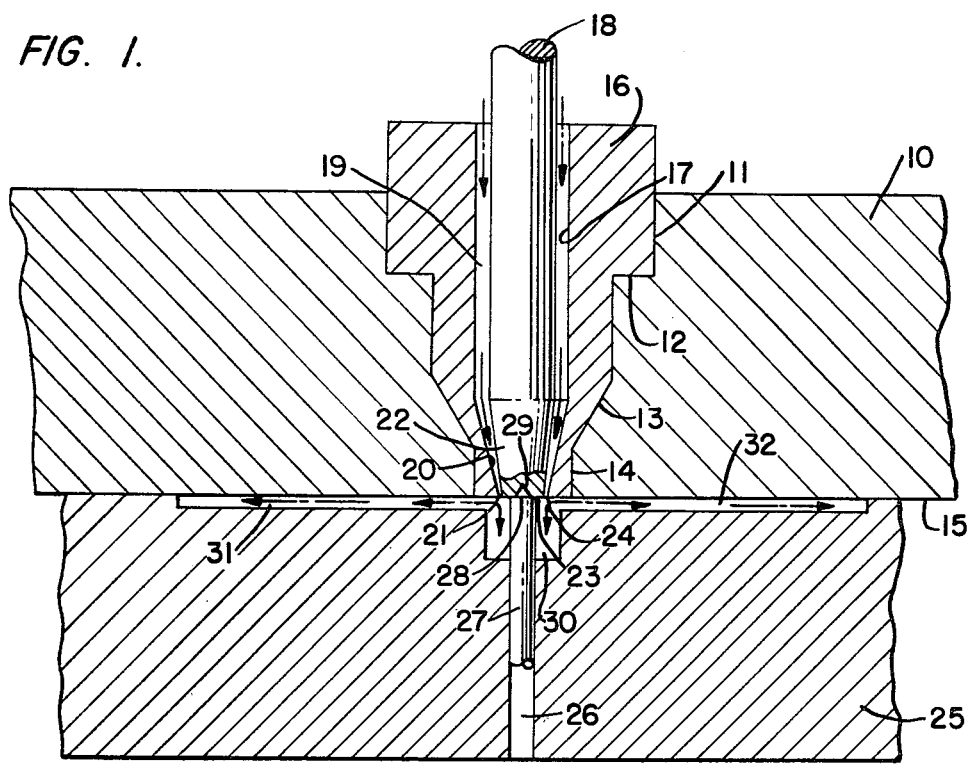
FIG. 1 is a cross-sectional view of a preferred embodiment of the present invention showing upper and lower mold elements joined along a parting line with the lower mold element having formed therein the mold cavities for the formation of a rotational structure and with the torpedo disposed in a housing in the upper mold element to provide an annular discharge of the plastic into the mold cavities and disposed to center and hold the core pin or axle in centered position with respect to the mold cavities.
Figure 2:
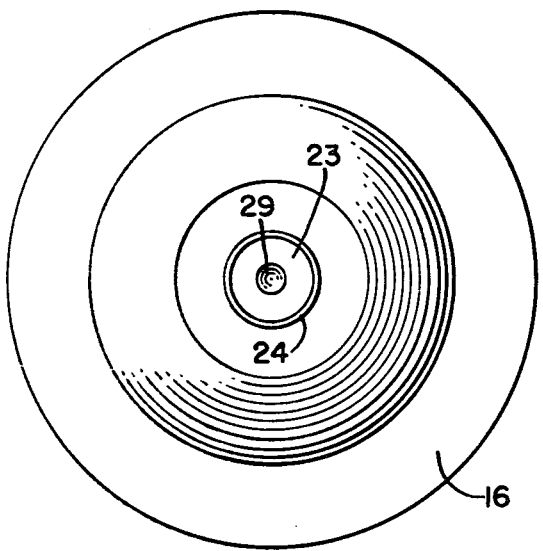
FIG. 2 is an enlarged view of the lower end of the torpedo and associated structure showing the annular discharge nozzle or gate for the plastic material and the female recess in the torpedo for centering the core pin or axle.
Figure 3:
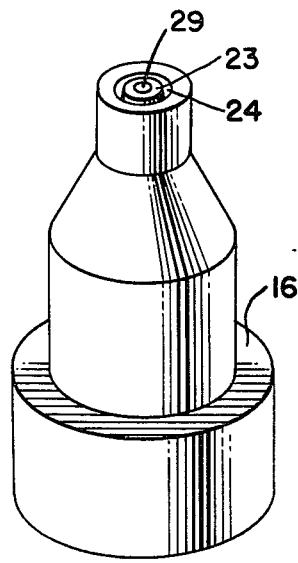
FIG. 3 is an elevational view of the housing for the torpedo in position reversed to that of FIG. 1 to clearly show the female recess in the end of the torpedo for centering the core pin or axle.

Referring now to FIGS. 1, 2 and 3, upper mold portion 10 is provided with a stepped aperture 11 having shoulder 12 and tapered portion 13 terminating in cylindrical portion 14 terminating on the parting line 15. A torpedo housing 16 conforms to the configuration of aperture 11 for a secure fit therein and is provided with a central bore 17 to receive torpedo 18 in spaced relation therewith to form an annular passage 19 for the flow of plastic around the torpedo. Bore 17 is tapered at 20 to form a circular opening of reduced size 21 for bore 17 and torpedo 18 is also tapered as at 22 and terminates in a flat end portion 23 on parting line 15. Taper 22 of torpedo 18 is spaced from tapered portion 20 of bore 17 to form an annular nozzle or gate 24 for discharge of the plastic into the mold cavities.

Lower mold portion 25 has a bore 26 for the core pin or axle 27. Core pin or axle 27 has a conical tip or male portion 28 which mates with a corresponding conical recess or female portion 29 in the flat surface 23 of torpedo 18.

Mold element 25 includes a mold cavity 30 to form the hub for the propeller, impeller or rotor to be molded from plastic material and also includes mold cavities 31 and 32 for the blades of the structure.

With the mold construction set up as above described, any suitable resin or plastic in plastic condition is forced downwardly around torpedo 18 which being heated maintains the flowability of the plastic and the plastic is then forced through the annular opening or gate 24 uniformly throughout 360° into the mold cavities 30, 31 and 32 in mold element 25 for an even distribution of the plastic material therein. The core pin or axle 27 is maintained centered by its mating relationship with the flat end 23 of torpedo 18 and is accurately centered in hub cavity 30 whereby the resulting propeller, impeller or rotor has no unbalancing portions of more dense plastic and the cast product has complete rotational balance.

It is to be understood that the dimensions of the flat end 23 of the torpedo; the dimensions of the annular nozzle 24; and the size of the male and female components 28 and 29 may vary depending on the product being molded. In a typical nozzle or gate in accordance with the present invention the diameter of opening 21 is 0.312 inch; the diameter of flat end 23 is 0.250 inch; the width of annular nozzle or gate 24 on a diameter is 0.031 inch; and the diameter of female recess 29 is 0.125 inch with a conical angle of 150°.

What we claim is:

1. An annular flow plastic extrusion nozzle and mold for molding rotary members of uniform density and rotary balance, comprising first and second mold elements joining on a parting line, a nozzle housing in said first element, a bore in said housing opening on said parting line, a torpedo in said bore and annularly spaced therefrom, a taper in said bore adjacent said parting line, a corresponding taper on said torpedo, a flat end surface for said torpedo on said parting line, an annular nozzle between said taper of said bore and said taper of said torpedo opening on said parting line, mold cavities in said second mold element receiving plastic from said annular nozzle, a centered bore in said second mold element adapted to receive an axle pin, a male portion on an end of said pin, a female portion in said flat end of said torpedo receiving said male portion and centering said axle when said mold elements are joined.

2. Structure as defined in claim 1, said mold cavities including a hub cavity centered on said bore in said second mold element and blade cavities extending from said hub cavity.

* * * * *

UNITED STATES PATENT AND TRADEMARK OFFICE
CERTIFICATE OF CORRECTION

PATENT NO. : 4,368,028

DATED : January 11, 1983

INVENTOR(S) : Anthony J. Grish et al

It is certified that error appears in the above-identified patent and that said Letters Patent is hereby corrected as shown below:

On the title page:

The filing date of this patent is shown as "Feb. 2, 1981".

It should be: -- March 2, 1981 --

Signed and Sealed this

Fifteenth Day of March 1983

[SEAL]

Attest:

GERALD J. MOSSINGHOFF

Attesting Officer

Commissioner of Patents and Trademarks